(12) United States Patent
Otomo et al.

(10) Patent No.: US 8,827,812 B2
(45) Date of Patent: Sep. 9, 2014

(54) GAME DEVICE, GAME DEVICE CONTROL METHOD, PROGRAM, AND INFORMATION STORAGE MEDIUM

(75) Inventors: Hitoshi Otomo, Chiba (JP); Takeshi Okubo, Chiba (JP); Yoshinori Shiigi, Tokyo (JP); Motoki Kanematsu, Kanagawa (JP); Takashi Onishi, Tokyo (JP); Kenichi Akiyama, Chiba (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 606 days.

(21) Appl. No.: 13/131,088

(22) PCT Filed: Jun. 18, 2009

(86) PCT No.: PCT/JP2009/061119
§ 371 (c)(1),
(2), (4) Date: May 25, 2011

(87) PCT Pub. No.: WO2010/061658
PCT Pub. Date: Jun. 3, 2010

(65) Prior Publication Data
US 2011/0237333 A1 Sep. 29, 2011

(30) Foreign Application Priority Data
Nov. 25, 2008 (JP) ................................. 2008-300234

(51) Int. Cl.
| A63F 9/24 | (2006.01) |
| A63F 13/00 | (2014.01) |
| G06F 17/00 | (2006.01) |
| G06F 19/00 | (2011.01) |
| A63F 13/12 | (2006.01) |
| A63F 13/10 | (2006.01) |

(52) U.S. Cl.
CPC ......... *A63F 13/10* (2013.01); *A63F 2300/6045* (2013.01); *A63F 13/12* (2013.01); *A63F 2300/8011* (2013.01); *A63F 2300/64* (2013.01); *A63F 2300/6661* (2013.01)

USPC .................. 463/42; 463/16; 463/20; 463/25; 463/29; 709/205

(58) Field of Classification Search
USPC ...................... 463/16, 25, 29, 42, 20; 709/205
See application file for complete search history.

(56) References Cited

U.S. PATENT DOCUMENTS

2008/0108438 A1* 5/2008 Sugiyama et al. .............. 463/42
2008/0242425 A1 10/2008 Isaka et al.

FOREIGN PATENT DOCUMENTS

EP 2000185 A1 12/2008
JP 09-164272 A 6/1997

(Continued)

OTHER PUBLICATIONS

Taiwanese Office Action corresponding to Taiwanese Patent Application No. 98127808, dated Aug. 20, 2012.

(Continued)

*Primary Examiner* — Adetokunbo O Torimiro
(74) *Attorney, Agent, or Firm* — Sughrue Mion, PLLC

(57) ABSTRACT

To provide a game device that is capable, in a match in which a player character group including operating characters of a plurality of game players and one or more teammate character competes with an opponent character or an opponent character group opposing the player character group, of improving diversity of combination of the characters belonging to the player character group while suppressing increase of data amount. An operating character obtaining unit (30) obtains the player data on an operating player of each game player. A teammate character obtaining unit (32) obtains the player data on a teammate player of each game player. A game execution unit (36) carries out a game in which an operating team takes part in a soccer match with an opponent team, based on the player data on the respective operating players and that on the respective teammate players.

6 Claims, 8 Drawing Sheets

(56) References Cited

FOREIGN PATENT DOCUMENTS

| JP | 2003-260272 A | 9/2003 |
| JP | 2007-215756 A | 8/2007 |
| JP | 2007-259991 A | 10/2007 |
| JP | 2008-246116 A | 10/2008 |

OTHER PUBLICATIONS

International Preliminary Report on Patentability corresponding to International Application No. PCT/JP2009/061119.

* cited by examiner

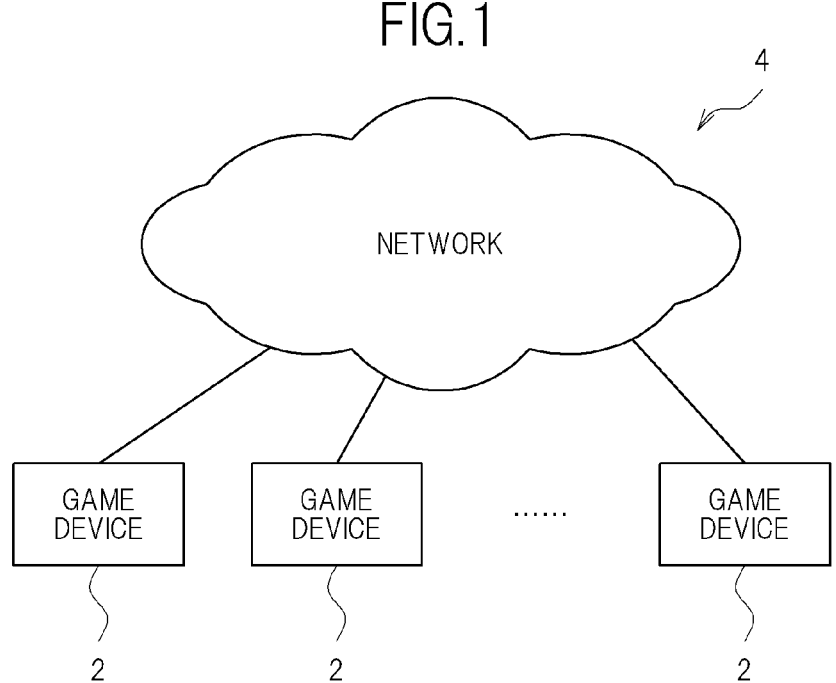
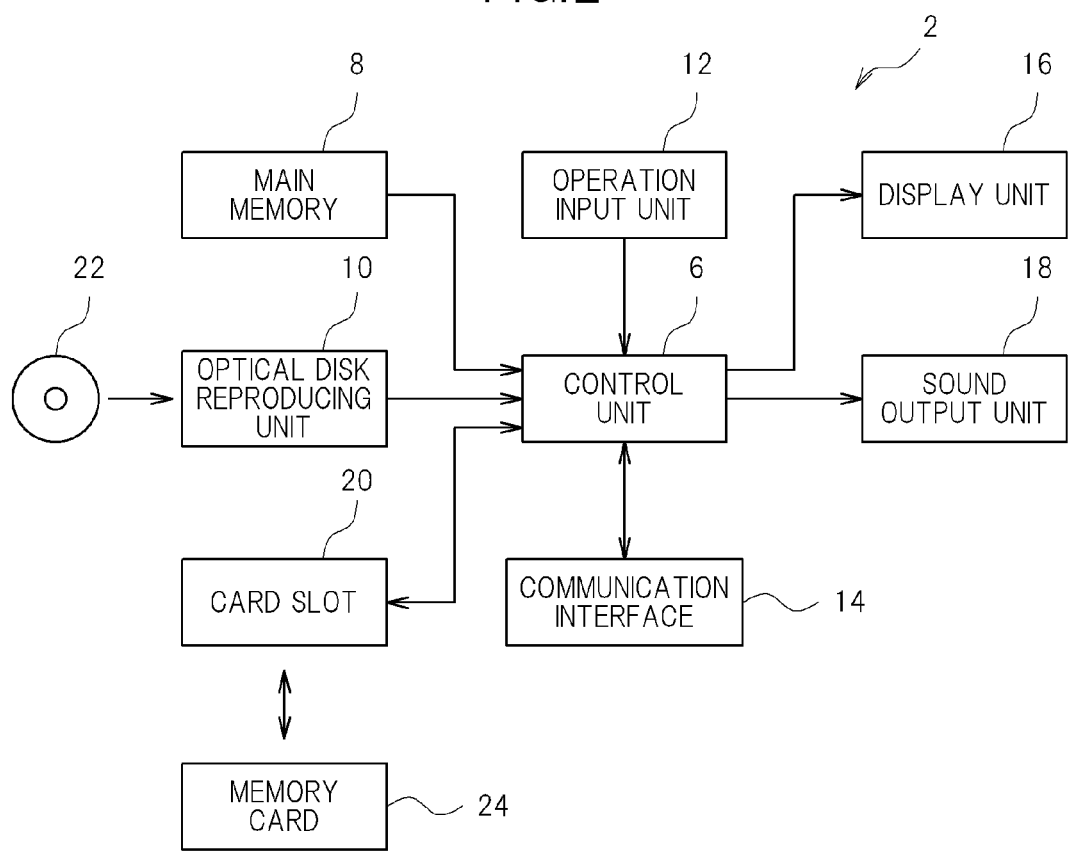

FIG.6

| FORMATION | FW | | | MF | | | | | DF | | GK |
|---|---|---|---|---|---|---|---|---|---|---|---|
| | CF | WG | ST | OMF | SMF | DMF | CMF | WB | CB | SB | |
| 3-4-3A | 1 | 2 | 0 | 1 | 2 | 1 | 0 | 0 | 3 | 0 | 1 |
| 3-4-3B | 1 | 2 | 0 | 0 | 2 | 2 | 0 | 0 | 3 | 0 | 1 |
| 3-4-3C | 1 | 2 | 0 | 0 | 0 | 0 | 4 | 0 | 3 | 0 | 1 |
| 4-3-3A | 1 | 2 | 0 | 2 | 0 | 1 | 0 | 0 | 2 | 2 | 1 |
| 4-3-3B | 1 | 2 | 0 | 1 | 0 | 2 | 0 | 0 | 2 | 2 | 1 |
| 4-3-3C | 1 | 2 | 0 | 0 | 0 | 0 | 3 | 0 | 2 | 2 | 1 |
| 5-3-2A | 2 | 0 | 0 | 2 | 0 | 1 | 0 | 0 | 5 | 0 | 1 |
| 5-3-2B | 2 | 0 | 0 | 1 | 0 | 2 | 0 | 0 | 5 | 0 | 1 |
| 5-3-2C | 2 | 0 | 0 | 0 | 0 | 0 | 3 | 0 | 5 | 0 | 1 |
| 4-4-2A | 2 | 0 | 0 | 1 | 2 | 1 | 0 | 0 | 2 | 2 | 1 |
| 4-4-2B | 2 | 0 | 0 | 1 | 0 | 0 | 3 | 0 | 2 | 2 | 1 |
| 4-4-2C | 2 | 0 | 0 | 2 | 0 | 2 | 0 | 0 | 2 | 2 | 1 |
| 4-4-2D | 2 | 0 | 0 | 0 | 0 | 0 | 4 | 0 | 2 | 2 | 1 |
| 4-4-2E | 1 | 0 | 1 | 2 | 2 | 0 | 0 | 0 | 2 | 2 | 1 |
| 4-4-2F | 1 | 0 | 1 | 1 | 1 | 2 | 0 | 0 | 2 | 2 | 1 |
| 3-5-2A | 2 | 0 | 0 | 2 | 2 | 1 | 0 | 0 | 3 | 0 | 1 |
| 3-5-2B | 2 | 0 | 0 | 1 | 2 | 2 | 0 | 0 | 3 | 0 | 1 |
| 3-5-2C | 2 | 0 | 0 | 1 | 0 | 2 | 0 | 2 | 3 | 0 | 1 |
| 5-4-1A | 1 | 0 | 0 | 1 | 2 | 1 | 0 | 0 | 5 | 0 | 1 |
| 5-4-1B | 1 | 0 | 0 | 0 | 0 | 0 | 4 | 0 | 5 | 0 | 1 |
| 5-4-1C | 1 | 0 | 0 | 2 | 0 | 2 | 0 | 0 | 5 | 0 | 1 |
| 4-5-1A | 1 | 0 | 0 | 2 | 2 | 1 | 0 | 0 | 2 | 2 | 1 |
| 4-5-1B | 1 | 0 | 0 | 0 | 2 | 1 | 2 | 0 | 2 | 2 | 1 |
| 4-5-1C | 1 | 0 | 0 | 2 | 0 | 0 | 3 | 0 | 2 | 2 | 1 |
| 4-5-1D | 1 | 0 | 0 | 1 | 2 | 2 | 0 | 0 | 2 | 2 | 1 |
| 3-6-1A | 1 | 0 | 0 | 2 | 2 | 1 | 1 | 0 | 3 | 0 | 1 |
| 3-6-1B | 1 | 0 | 0 | 2 | 2 | 0 | 2 | 0 | 3 | 0 | 1 |

FIG.7

| SELECTION CONDITION | FORMATION |
|---|---|
| FOUR OPERATING PLAYERS WITH DESIRED POSITION FW (SELECTION CONDITION 1) | 3-4-3A |
| THREE OPERATING PLAYERS WITH DESIRED POSITION FW AND ONE OPERATING PLAYER WITH DESIRED POSITION OMF OR DMF (SELECTION CONDITION 2) | 3-4-3A |
| THREE OPERATING PLAYERS WITH DESIRED POSITION FW AND ONE OPERATING PLAYER WITH DESIRED POSITION CMF (SELECTION CONDITION 3) | 3-4-3C |
| THREE OPERATING PLAYERS WITH DESIRED POSITION FW AND ONE OPERATING PLAYER WITH DESIRED POSITION SMF (SELECTION CONDITION 4) | 3-4-3A |
| TWO OPERATING PLAYERS WITH DESIRED POSITION FW AND ANY OPERATING PLAYER WITH DESIRED POSITION SMF (SELECTION CONDITION 5) | 3-4-3A |
| TWO OPERATING PLAYERS WITH DESIRED POSITION FW AND NO OPERATING PLAYERS WITH DESIRED POSITION SMF (SELECTION CONDITION 6) | 3-4-3A |
| ONLY ONE OR NO OPERATING PLAYER WITH DESIRED POSITION FW (SELECTION CONDITION 7) | 3-6-1B |

FIG.8

| PLAYER | TEAM | FIELD | PLAYER TYPE | OWN PLAYER |
|---|---|---|---|---|
| 1 | 0 | 1 | P | P1 |
| 2 | 0 | 1 | P | P2 |
| . | . | . | . | . |
| . | . | . | . | . |
| . | . | . | . | . |
| 22 | 0 | 2 | F | — |
| 23 | 0 | 0 | F | — |
| 24 | 1 | 1 | E | — |
| 25 | 1 | 1 | E | — |
| . | . | . | . | . |
| . | . | . | . | . |
| . | . | . | . | . |
| 45 | 1 | 0 | E | — |
| 46 | 1 | 0 | E | — |

FIG.9
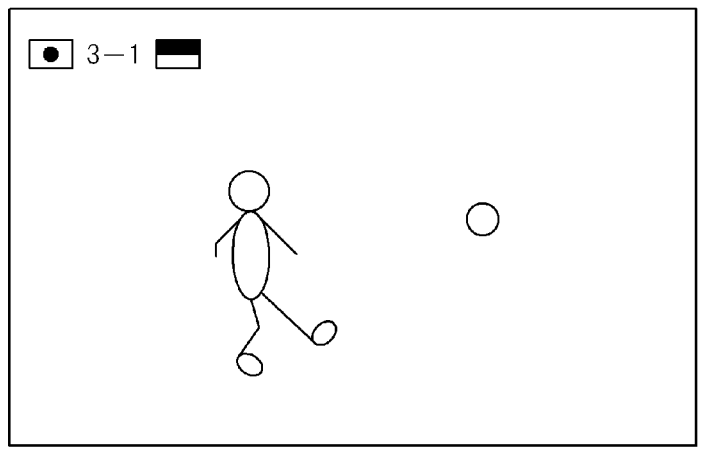
FIG.10
| PLAYER | OPERATION TARGET | POSITION | BALL HOLDING | LOCATION | MOVEMENT DIRECTION | POSTURE | ACTION | TIREDNESS |
|---|---|---|---|---|---|---|---|---|
| 1 | P1 | WG | 1 | - | - | - | - | 44 |
| 2 | P2 | WG | 0 | - | - | - | - | 31 |
| 3 | P3 | CF | 0 | - | - | - | - | 16 |
| 4 | P4 | DMF | 0 | - | - | - | - | 7 |
| ⋮ | ⋮ | ⋮ | ⋮ | ⋮ | ⋮ | ⋮ | ⋮ | ⋮ |
| 11 | - | - | 0 | - | - | - | - | 22 |
| 24 | - | - | 0 | - | - | - | - | 51 |
| ⋮ | ⋮ | ⋮ | ⋮ | ⋮ | ⋮ | ⋮ | ⋮ | ⋮ |
| 34 | - | - | 0 | - | - | - | - | 55 |
FIG.11
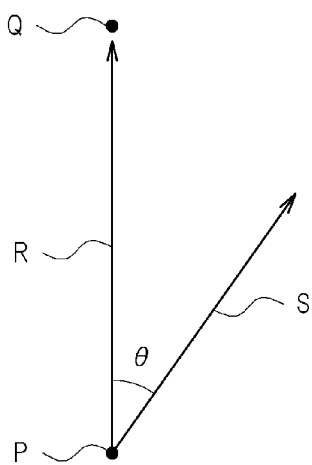

GAME DEVICE, GAME DEVICE CONTROL METHOD, PROGRAM, AND INFORMATION STORAGE MEDIUM

CROSS REFERENCE TO RELATED APPLICATIONS

This application is a National Stage of International Application No. PCT/JP2009/061119 filed Jun. 18, 2009, which claims priority from Japanese Patent Application No. 2008-300234 filed Nov. 25, 2008, the contents of all of which are incorporated herein by reference in their entirety.

TECHNICAL FIELD

The present invention relates to a game device, a game device control method, a program, and an information storage medium.

BACKGROUND ART

A match game in which a player character group corresponding to a plurality of game players competes with an opponent character group or an opponent character opposing the player character group is available.

For example, there is known a soccer game in which an operating team (corresponding to a player character group) to which a plurality of operating players corresponding to a plurality of game players and one or more teammate players belong participates in a soccer match with an opponent team (corresponding to an opponent character group) (Patent Document 1 below). In such a soccer game, the respective game players cooperatively aim to cause as many score events as possible for the operating team.
Patent Document 1: Japanese Patent Laid-open Publication No. 2007-259991

DISCLOSURE OF THE INVENTION

Problems to be Solved by the Invention

For example, in the above described soccer game, one soccer team selected from among a plurality of soccer teams prepared in advance is used as an operating team. Thus, combination of soccer players belonging to an operating beam is limited to those prepared in advance. Therefore, a game player may not feel fully satisfied with the extent of diversity of the combination of soccer players belonging to an operating team.

Regarding this point, in order to improve diversity of combination of soccer players belonging to an operating team, an increased number of soccer teams may be prepared in advance. However, this requires storage of data on many soccer teams, which increases data amount.

The present invention has been conceived in view of the above, and aims to provide a game device, a game device control method, a program, and an information storage medium capable of improving, in a game in which a player character group including operating characters of a plurality of game players and one or more teammate characters compete with an opponent character or an opponent character group opposing the player character group, diversity of combination of characters belonging to the player character group while suppressing increase of data amount.

Means for Solving the Problems

In order to solve the above described problem, a game device according to the present invention is a game device for implementing a match in which a player character group corresponding to a plurality of game players competes with an opponent character or an opponent character group opposing the player character group, comprising: an operating character obtaining unit for obtaining, for each of the plurality of game players, data on an operating character operated by the game player; a teammate character obtaining unit for obtaining, for at least one game player among the plurality of game players, data on one or more teammate characters selected by the game player from among a plurality of characters owned by the game player; and a game execution unit for implementing a match in which the player character group to which a plurality of operating characters corresponding to the plurality of game players and the teammate character selected by the at least one game player belong competes with the opponent character or the opponent character group, based on the data obtained by the operating character obtaining unit and the data obtained by the teammate character obtaining unit.

A game device control method according to the present invention is a method for controlling a game device for implementing a match in which a player character group corresponding to a plurality of game players competes with an opponent character or an opponent character group opposing the player character group, the method comprising: an operating character obtaining step of obtaining, for each of the plurality of game players, data on an operating character operated by the game player; a teammate character obtaining step of obtaining, for at least one game player among the plurality of game players, data on one or more teammate characters selected by the game player from among a plurality of characters owned by the game player; and a game executing step of implementing a match in which the player character group to which a plurality of operating characters corresponding to the plurality of game players and the teammate character selected by the at least one game player belong competes with the opponent character or the opponent character group, based on the data obtained at the operating character obtaining step and the data obtained at the teammate character obtaining step.

A program according to the present invention is a program for causing a computer, such as a consumer game device, a commercial game device, a portable game device, a personal digital assistant, and so forth, to function as a game device for implementing a match in which a player character group corresponding to a plurality of game players competes with an opponent character or an opponent character group opposing the player character group, the program for causing the computer to function as: an operating character obtaining unit for obtaining, for each of the plurality of game players, data on an operating character operated by the game player; a teammate character obtaining unit for obtaining, for at least one game player among the plurality of game players, data on one or more teammate characters selected by the game player from among a plurality of characters owned by the game player; and a game execution unit for implementing a match in which the player character group to which a plurality of operating characters corresponding to the plurality of game players and the teammate character selected by the at least one game player belong competes with the opponent character or the opponent character group, based on the data obtained by the operating character obtaining unit and the data obtained by the teammate character obtaining unit.

An information storage medium according to the present invention is a computer readable information storage medium storing the above described program.

The present invention relates to a game device for implementing a match in which a player character group corresponding to a plurality of game players competes with an opponent character or an opponent character group opposing the player character group. According to the present invention, for each of the plurality of game players, data on an operating character operated by the game player is obtained. For at least one game player among the plurality of game players, data on one or more teammate characters selected by the game player from among a plurality of characters owned by the game player is obtained. Then, a match in which the player character group to which a plurality of operating characters corresponding to the plurality of game players and the teammate character selected by the at least one game player belong competes with the opponent character or the opponent character group is carried out, based on the data on the operating character and the data on the teammate character. According to the present invention, diversity of combination of characters belonging to a player character group is improved while suppressing increase of data amount.

According to one aspect of the present invention, the game execution unit may include a desired role obtaining unit for obtaining a desired role of each of the operating characters, a role assigning unit for assigning a role to each of the operating characters, a teammate character selecting unit for selecting one or more teammate characters from among teammate characters belonging to the player character group, an entry execution unit for causing the one or more teammate characters selected by the teammate character selecting unit and the respective operating characters to enter the match, and a control unit for controlling, based on a result of comparison between the role assigned to an operating character and the desired role of the operating character, obtained by the desired role obtaining unit, selection by the teammate character selecting unit of a teammate character owned by a game player operating the operating character.

According to one aspect of the present invention, the teammate character selecting unit may include a first teammate character selecting unit for selecting, before the match starts, one or more teammate characters from among the teammate characters belonging to the player character group, and a second teammate character selecting unit for selecting one or more teammate characters from among teammate characters not selected by the first teammate character selecting unit, the entry execution unit may include a first entry execution unit for causing, at beginning of the match, the one or more teammate characters selected by the first teammate character selecting unit and the respective operating characters to enter the match, and a second entry execution unit for causing the one or more teammate characters selected by the second teammate character selecting unit to enter the match halfway through the match, and the control unit may control, based on a result of comparison between the role assigned to an operating character and the desired role of the operating character, obtained by the desired role obtaining unit, selection by the second teammate character selecting unit of a teammate character owned by a game player operating the operating character.

According to one aspect of the present invention, the game execution unit may include a desired role obtaining unit for obtaining a desired role of each of the operating characters, a role assigning unit for assigning a role to each of the operating characters, a first teammate character selecting unit for selecting one or more teammate characters from among teammate characters belonging to the player character group, an entry execution unit for causing the one or more teammate characters selected by the first teammate character selecting unit and the respective operating characters to enter the match, a second teammate character selecting unit for selecting one or more teammate characters during the match from among teammate characters participating in the match, a departure execution unit for causing the one or more teammate characters selected by the second teammate character selecting unit to depart from the match, and a control unit for controlling, based on a result of comparison between the role assigned to an operating character and the desired role of the operating character, obtained by the desired role obtaining unit, selection by the second teammate character selecting unit or execution of departure by the departure execution unit of a teammate character owned by a game player operating the operating character.

According to one aspect of the present invention, the game device may further comprise a desired role obtaining unit for obtaining a desired role selected by each of the plurality of game players, a role assigning unit for assigning a role to each of the operating characters, a parameter storage unit for storing a parameter on each of the operating characters, and an increase/decrease unit, based on a result of comparison between the role assigned to an operating character and a desired role selected by a game player operating the operating character, for increasing or decreasing a value of the parameter on the operating character.

According to one aspect of the present invention, the game device may include a desired role obtaining unit for obtaining a desired role of each of the operating characters, and a role assigning unit for assigning a role to each of the operating characters, the teammate character obtaining unit, after the role assigning unit assigns a role to each of the operating characters, may obtain data on the teammate character, and the game device may further comprise a control unit for controlling, based on a result of comparison between the role assigned to an operating character and the desired role of the operating character, obtaining of the data on the teammate character by the teammate character obtaining unit, for a game player operating the operating character.

BRIEF DESCRIPTION OF THE DRAWINGS

FIG. 1 is a diagram showing a structure of a game system including a plurality of game devices according to an embodiment of the present invention;

FIG. 2 is a diagram showing one example of a hardware structure of a game device;

FIG. 6 is a diagram showing content stored in a first formation table;

FIG. 7 is a diagram showing content stored in a second formation table;

FIG. 8 is a diagram showing content stored as basic data;

FIG. 9 is a diagram showing one example of a game screen image;

FIG. 10 is a diagram showing content stored as game situation data;

FIG. 11 is a diagram explaining a method for determining a movement direction of a soccer ball;

BEST MODE FOR CARRYING OUT THE INVENTION

[1. Structure of Game System]

Figure 3:
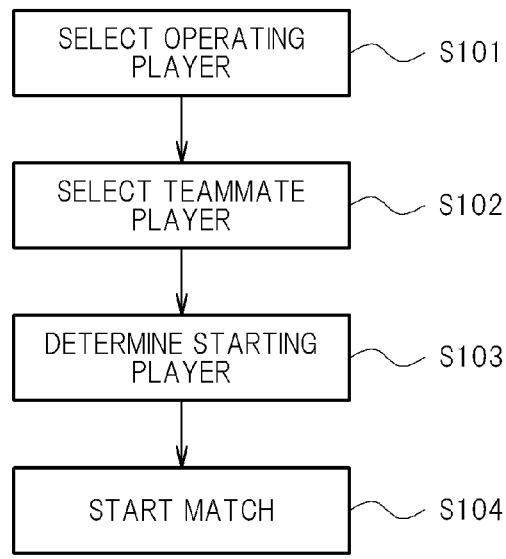
FIG. 3 is a diagram showing a processing flow before a soccer match starts.

FIG. 1 is a diagram showing a structure of a game system 4 including a plurality of game devices according to an embodiment of the present invention. As shown in the diagram, the game system 4 includes a plurality of game devices 2 of game players. The respective game devices 2 are connected to a network.

[2. Game Device]

The game device 2 may be, e.g., a consumer game device, a commercial game device, a portable game device, a portable phone, a personal digital assistant, and so forth. FIG. 2 shows a hardware structure of a game device 2 according to this embodiment. As shown in the diagram, the game device 2 includes a control unit 6, a main memory 8, an optical disk reproducing unit 10, an operation input unit 12, a communication interface 14, a display unit 16, a sound output unit 18, and a card slot 20. Note that the game device 2 may have a plurality of card slots 20.

The control unit 6 may be, e.g., a microprocessor. The control unit 6 carries out various information processes according to a program for a soccer game, read into the main memory 8. The main memory 8 may be, e.g., a RAM. In the main memory 8, the program read from the optical disk 22 (see FIG. 2) or save data read from the memory card 24 (see FIG. 2) are stored. The main memory 8 stores various data necessary for information processing. The optical disk reproducing unit 10 reads the program stored in the optical disk 22. The operation input unit 12 is a user interface on which a user inputs an operation. The operation input unit 12 is e.g., a controller. The communication interface 14 is an interface for connecting a game device 2 to a network. The display unit 16 outputs a game screen image according to an instruction supplied from the control unit 6. The display unit 16 is e.g., a display device, such as one used in, e.g., a home-use television set or used as a liquid crystal monitor, or the like. The sound output unit 18 outputs various sound data, such as game music, game sound effects, and so forth, read from the optical disk 22, according to an instruction supplied from the control unit 6. The sound output unit 18 is, e.g., a speaker, a headphone, or the like. The card slot 20 reads save data recorded in the memory card 24. In addition, the card slot records save data in the memory card 24 according to an instruction supplied from the control unit 6.

The optical disk 22 is, e.g., a CD-ROM, a DVD (registered trademark)-ROM, or the like, where the above described program is recorded. The memory card 24 is a nonvolatile memory, such as, e.g., EEPROM, or the like, where save data is recorded.

[3. Game Mode for Soccer Game]

In the game device 2, a soccer game is provided by the control unit 6 by operating according to the above described program. For a soccer game, two game modes, namely, a local mode and a network match mode, are available so that a game player can play in a respective game mode in a game device 2.

In the local mode, a game player can enjoy a soccer game for a single-player use. Specifically, in the local mode, a game player can obtain new player characters as the game player plays more matches. Data on player characters obtained by a game player (hereinafter referred to as player data) can be stored as save data in the memory card 24 so that a game player can collect player characters. The ability of a player character obtained improves as the game player uses the player character in a soccer game match. That is, a game player can train a collected player character.

In the network match mode, on the other hand, a game player can enjoy a soccer game with a game player of another game device 2 via a network. Specifically, in the network match mode, a soccer match (match) is carried out between an operating team (a player character group) corresponding to four game players and an opponent team (an opponent character group) which opposes the operating team. Each game player operates their own operating player character (hereinafter referred to as an operating player), aiming to cause more score events than the opponent team.

[4. Processing flow Before Soccer Match Starts]

In the following, a flow to be carried out before a soccer match starts in the network match mode will be described.

In the network match mode, each game player initially carries out a predetermined operation to connect their game device 2 to a network game management device (not shown) for communication. Then, the network game management device carries out pre-processing to start a soccer match. Specifically, the network game management device initially selects four game devices 2 from among a plurality of game devices 2 connected for communication to itself. Below, suppose that the network management device selects the game device 2 of a game player P1, the game device 2 of a game player P2, the game device 2 of a game player P3, and the game device 2 of a game player P4. Note that the game players P1 to P4 are hereinafter referred to simply as a "game player" when not being particularly discriminated.

Then, the network game management device selects one of the game devices 2 (four game devices 2, here) of the respective game players to have the selected game device 2 serve as a game server (game device). Below, suppose that the game device 2 of the game player P1 is selected as a game server. Thereafter, the network game management device notifies the game server of the IP addresses of the three game devices 2 other than the game server, and also notifies the three game devices 2 other than the game server of the IP address of the game server. With the above, the game server and the respective game devices 2 are ready to communicate with one another via a network.

FIG. 3 is a diagram showing a flow to be carried out before a soccer match starts. As shown in the diagram, a "flow before start of a soccer match" includes steps (S101 to S102) of forming an operating team, steps S103 of determining eleven player characters (hereinafter referred to as starting players) to participate in a match from the beginning of the match, and a step S104 of starting a soccer match. At the steps (S101 to S102) of forming an operating team, twenty-three player characters forming an operating team are determined. At the step (S103) of determining the starting players, eleven starting players including four operating players are selected.

Initially, the steps (S101 to S102) of forming an operating team will be described.

[4-1. Selection of Operating Player: S101]

At S101, a game player of each of the game devices 2 (including the game server) selects an operating player from the plurality of player characters which they have collected so far. For example, a game player may select their most favorite player character.

Specifically, the control unit 6 (operating character obtaining means) of the game server sends an operating player selection request to the respective game devices 2 (the game devices 2 of the game players P2 to P4) not selected as a game server. Having received the operating player selection request, the game device 2 shows on a game screen a list of player characters collected by the game player 2 so far (hereinafter referred to as a "player list"), based on the player data stored in the memory card 24, and encourages the game player to select one operating player. The game player is further encouraged to select one position (hereinafter referred to as a "desired position") which the game player wishes to assign to the operating player.

Similarly, the control unit 6 (operating character obtaining means) of the game server (the game device 2 of the game player P1) encourages the game player to select an operating player and a desired position.

Below, the above mentioned "position" will be described. A position means a type of role to be undertaken by a player character in a soccer team. In this embodiment, eleven types of positions are available.

Specifically, three kinds of positions, namely, CF (center forward), ST (second-top), and WG (wing), are available as roles mainly responsible for attack, with these positions being hereinafter referred to as FW (forward) when not being particularly discriminated. Further, positions, namely, CB (center back) and SB (side back), are available as roles mainly responsible for defense, with these positions being hereinafter referred to as DF (defender) when not being particularly discriminated. Still further, five kinds of positions, namely, CMF (central midfielder), SMF (side-midfielder), OMF (offensive midfielder), WB (wing-back), and DMF (defensive midfielder), are available as roles mainly responsible for supporting a FW or DF player character, with these positions being hereinafter referred to as a MF (midfielder) when not being particularly discriminated. Finally, a position GK (goal keeper) is available. In this embodiment, a game player selects a desired position from among the eight kinds of positions including the five MF positions and the three FW positions.

With selection of an operating player and a desired position completed, the control unit 6 of each of the game devices 2 (the game devices 2 of the game players P2 to P4 2) which are not selected as a game server reads the player data on the operating player from the memory card 24, and sends the player data to the game server together with the ID of the desired position.

Having received the player data on the respective operating players of the game players P2 to P4 and the ID of the respective desired positions for the game players P2 to P4 from the respective game devices 2 (the game devices 2 of the game players P2 to P4) not selected as a game server, the control unit 6 (an operating character obtaining means) of the game server stores the received player data and ID so as to be correlated to each other in the main memory 8 (parameter storage means). In addition, the control unit 6 of the game server (the game device 2 of the game player P1) reads the player data on the operating player selected by the game player P1 from the memory card 24, and stores the read player data so as to be correlated to the ID of the desired position selected by the game player P1 in the main memory 8 (parameter storage means).

Note that in the description below, an "operating player of a game player" refers to an operating player selected by a game player. For example, an "operating player of the game player P1" refers to an operating player selected by the game player P1. Further, a "desired position for an operating player" refers to a desired position selected by a game player who selects the operating player.

[4-2. Selection of Teammate Player: S102]

At S102, each game player selects two or more player characters from the game player list. For example, each game player may select their four most favorite player characters other than the operating player. A player character selected at S102 will be hereinafter referred to as a "teammate player".

Specifically, the control unit 6 (teammate character obtaining means) of the game server sends a teammate player selection request to the respective game devices 2 (game devices 2 of the game players P2 to P4) not selected as a game server. Having received the teammate player selection request, each game device 2 encourages the game player to select four teammate players from the player list. Similarly, the control unit 6 (teammate character obtaining means) of the game server (the game device 2 of the game player P1) encourages the game player P1 to select four teammate players.

In this embodiment, each game player selects from the player list one teammate player to which the game player wishes to assign a FW position (hereinafter referred to as a FW teammate player), one teammate player to which the game player wishes to assign an MF position (hereinafter referred to as an MF teammate player), one teammate player to which the game player wishes to assign a DF position (hereinafter referred to as a DF teammate player), and one teammate player to which the game player wishes to assign a GK position (hereinafter referred to as a GK teammate player). Note that a "teammate player of a game player" hereinafter refers to a teammate player selected by a game player.

With four teammate players selected, each of the game devices 2 not selected as a game server reads the player data on the respective teammate players from the memory card 24, and sends the player data together with the ID's of the desired positions for the teammate players to the game server. Specifically, when sending the player data on a FW teammate player to the game server (the game device 2 of the game player P1), each of the game devices (game devices 2 of the game players P2 to P4) sends the ID of the FW. Similarly, when sending the player data on an MF teammate player to the game server, each game device 2 sends the ID of the MF; when sending the player data on a DF teammate player to the game server, each game device 2 sends the ID of the DF; and when sending the player data on a GK teammate player to the game server, each game device 2 sends the ID of the GK.

The control unit 6 (teammate character obtaining means) of the game server receives the player data on the respective teammate players of the respective game players P2 to P4 and the ID's of the respective desired positions for the teammate players of the respective game players P2 to P4 from the respective game devices 2 not selected as a game server, and stores the player data and the ID's in the main memory 8. The control unit 6 (teammate character obtaining means) of the game server (the game device 2 of the game player P1) also reads the player data on the teammate players of the game player P1 from the memory card 24, and stores the player data in the main memory 8 together with the ID's of the desired positions for the respective teammate players.

That is, at S101 and S102, the player data on twenty player characters including the four operating players and sixteen teammate players are stored in the main memory 8 of the game server. Further, the control unit 6 of the game server reads the player data on three teammate players from the optical disk 22, which are prepared in advance, besides the player data on the twenty player characters. With the above, the control unit 6 has obtained the player data on the twenty-three player characters belonging to the operating team.

Still further, the control unit 6 of the game server reads the player data on twenty-three player characters belonging to the opponent team. Note that a player character belonging to the opponent team will be hereinafter referred to as an opponent player.

As described above, in this soccer game, as a team is formed by the player characters collected by the respective game players, combination of the player characters belonging to the operating team will be changed when combination of four game players playing in the network match mode is changed. This improves diversity of combination of player characters belonging to the operating team.

In this soccer game, as a player character collected by a game player in a local mode constitutes a teammate player, a game player can introduce a player character of their collection to other game players. This can impart incentive to a game player for collecting player characters.

Note that as a method for improving diversity of combination of player characters belonging to an operating team, there is available a method in which many candidates as teams for selection as an operating team by a game player are prepared in advance. According to this method, however, increase of the number of teams results in increase of data amount.

Meanwhile, in this embodiment, because preparation of teams as candidates for selection by a game player is unnecessary, it is possible to improve diversity of combination of player characters belonging to an operating team without increasing data amount.

The control unit 6 of the game server carries out a soccer game, based on the player data on forty-six player characters in total. Note that, in this embodiment, the player data includes a value indicating the levels of various abilities of a player character and data on the appearance of a player character. Note that the ability of a player character may include, e.g., the below.
1. physical ability
2. running ability
3. kicking ability
4. cooperation ability "Physical ability" concerns physical ability of a player character; "running ability" concerns a speed at which a player character runs; "kicking ability" concerns a strength with which a player character kicks a soccer ball; and "cooperation ability" concerns ability of a player character to cooperate with another player character. A higher value of each ability means a higher level of that ability.

[4-3. Determination of Starting Player: S103]

Below, S103 will be described. Specifically, at S103, the game server carries out a process to decide eleven starting players to participate in a match from the beginning. In this embodiment, the four operating players operated by the respective game players P1 to P4 and the three teammate players prepared in advance and read from the optical disk 22 are selected as starting players without failure. Therefore, four more starting players need to be selected at S103 from the sixteen "teammate players of the game players" belonging to the operating team. Below, a process to be carried out at S103 in the game server will be described with reference to the flowchart of FIGS. 4 and 5.

That is, initially, the control unit 6 of the game server selects one formation to be employed in a match by the operating team from among a plurality of kinds of formations recorded in the first formation table shown in FIG. 6 (S201). Note that a "formation" refers to a formation formed by eleven player characters participating in a match. For each formation, the number of player characters to be assigned to each position is determined in advance (see FIG. 6). Note that the formation selected at S201 is hereinafter referred to as an actual formation.

FIG. 6 is a diagram showing one example of content recorded in the first formation table. The first formation table is recorded in advance in the optical disk 22. As shown in the diagram, the first formation table includes a formation field and a position field concerning the respective positions. In the formation field, a formation type is recorded. In a position field concerning the respective positions, the regular number of player characters to be assigned to each position in each formation is recorded. For example, the regular number of CF players in the formation "3-4-3A" is one.

Figure 5:
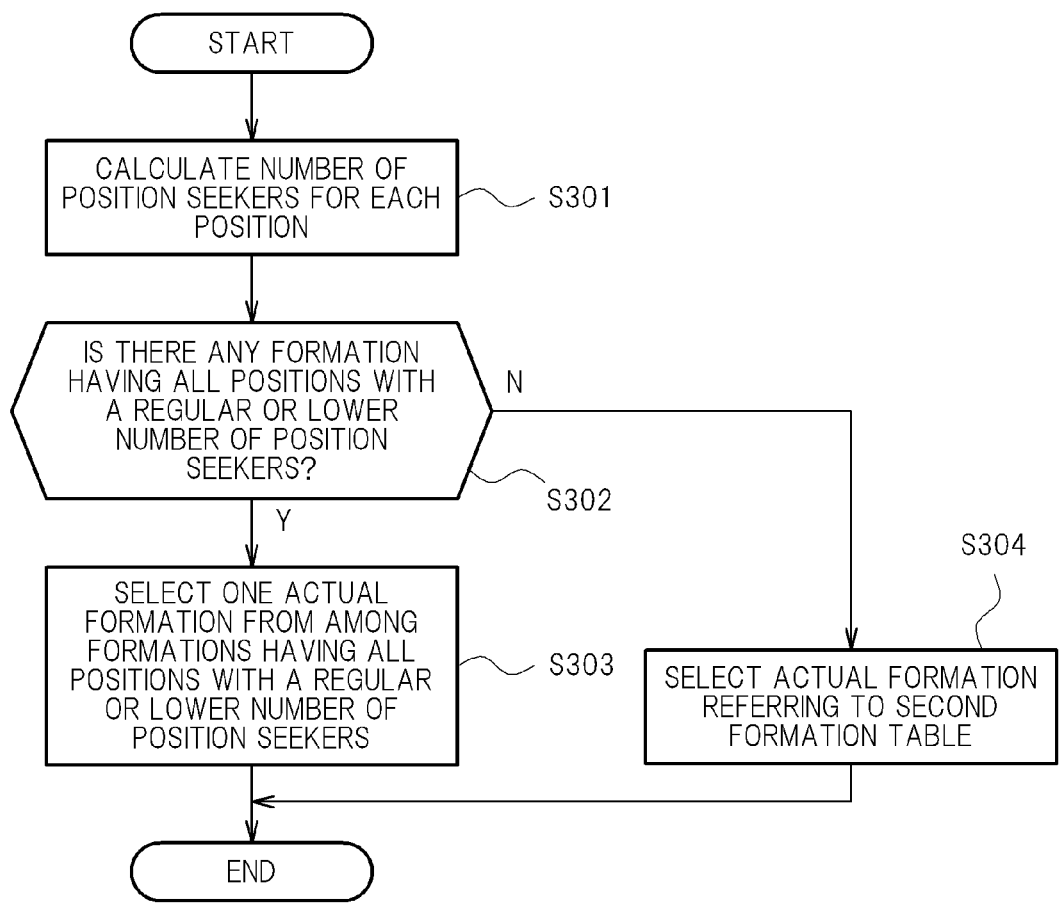
FIG. 5 is a flowchart of one example of a process to be carried out in a game server.

Note that any formation other than those shown in FIG. 6, such as those shown below, is not available.
1. formation including four or more FW player characters
2. formation including three or more CF player characters
3. formation including two or more ST player characters In this embodiment, the control unit 6 (role assigning means) of the game server carries out the process shown in FIG. 5 at S201 to select an actual formation. Specifically, for each position, the control unit 6 of the game server determines the number of operating players having that position as a desired position (hereinafter referred to as a number of position seekers) (S301). Then, with reference to the first formation table, the control unit 6 of the game server determines whether or not there is any formation available having all positions with the regular or lower number of position seekers (S302). When such a formation having all positions with the regular or lower number of position seekers is available (Y at S302), the control unit 6 of the game server selects as an actual formation one of such formations having all positions with the regular or lower number of position seekers (S303).

Meanwhile, when there is not such a formation having all positions with the regular or lower number of position seekers (N at S302), the control unit 6 of the game server selects an actual formation based on the second formation table shown in FIG. 7 (S304). Below, an example, for example, in which the desired positions of the operating players of the game players P1 and P2 are ST, that of the operating player of the game player P3 is CF, and that of the operating player of the game player P4 is DMF (hereinafter referred to as a specific example X) will be described. In this example, as two operating players have ST as a desired position, the number of position seekers of the position ST is decided two. However, as shown in FIG. 6, there is no formation having ST with the regular number being two or larger, the control unit 6 of the game server proceeds to S304.

FIG. 7 is a diagram showing content recorded in the second formation table. The second formation table is recorded in advance in the optical disk 22. As shown in the diagram, the second formation table includes a selection condition field and a formation field. In the selection condition field, a selection condition concerning a combination of desired positions of an operating player is recorded. In the formation field, the type of a formation recorded in the first formation table is recorded.

In this embodiment, at S304, the control unit 6 of the game server sees whether or not a combination of the desired positions of the operating players satisfies any of the selection conditions to thereby specify a selection condition satisfied by the combination of the desired positions of the operating players. Then, the control unit 6 of the game server (role assigning means) selects as an actual formation a formation correlated to the selection condition satisfied by the combination of the desired positions of the operating players. For example, in the case of the specific example X, which satisfies the selection condition 2, as shown in FIG. 7, the formation "3-4-3A" is selected.

With an actual formation selected at S201, the control unit 6 of the game server assigns a responsible position to each operating player with reference to the first formation table (S202). In the above, on principle, a desired position is assigned to an operating player as a responsible position. However, when a desired position of an operating player is not included in the actual formation, a position selected at random from among the FW and MF positions is assigned instead as a responsible position to the operating player.

For example, in the case of the specific example X, the formation "3-4-3A" is set as an actual formation, as described above. In this case, as a desired position, namely, "CF", of the operating player of the game player P3 is included in the actual formation, a responsible position "CF" is assigned to the operating player. However, as a desired position, namely, "ST", of the operating player of the game player P1 is not included in the actual formation, any of the "WG", "OMF", and "SMF" is assigned to the operating player. With the process at S202, responsible positions are assigned to the respective operating players.

The control unit 6 of the game server (control means, increase/decrease means) updates the player data of an operating player assigned a responsible position that is different from a desired position by increasing the values of "physical ability" and "cooperation ability" in the player data (S203). The control unit 6 of the game server also increases the values of "physical ability" and "cooperation ability" in the player data of a teammate player of a "game player operating an operating player assigned a responsible position that is different from a desired position". The significance of the process at S203 will be described later.

Then, the control unit 6 of the game server selects four teammate players to serve as starting players from among the sixteen teammate players other than the three teammate players read from the optical disk 22 (S204). Selection of a teammate player is controlled, based on a result of comparison between a responsible position assigned to an operating player and a desired position.

For example, when there is no "operating player assigned a responsible position that is different from a desired position", one teammate player is selected from teammate players of each of the game players.

Meanwhile, when there is an "operating player assigned a responsible position that is different from a desired position", a teammate player is selected such that a larger number of teammate players of a "game player operating an operating player assigned a responsible position that is different from a desired position" (hereinafter referred to as a priority game player) are selected as a starting player than a teammate player of a "game player operating an operating player assigned a responsible position identical to a desired position" (hereinafter referred to as a non-priority game player). As a result, a larger number of teammate players of a priority game player are selected as starting players than those of a non-priority game player, so that a teammate player of the priority game player is selected with priority. In the case of the specific example X, for example, two teammate players of the game player P1, or a priority game player, are selected and two teammate players of the game player P2, or a priority game player, are selected, while no teammate player of the game players P3, P4, or non-priority game players, are selected as a starting player.

Note that when all game players are non-priority game players, the control unit 6 of the game server selects one teammate player of each of the game players.

The above described are the details of the process at S103. With the process at S103, eleven starting game players including the four operating players, four "teammate players of the game players", and three teammate players read from the optical disk 22 are determined. Note that the control unit 6 of the game server also assigns responsible positions to the seven starting players other than the four operating players. For example, the control unit 6 of the game server assigns a desired position to each teammate player as a responsible position.

Note that when a position that is different from a desired position is assigned to an operating player, the game player operating the operating player may feel dissatisfied.

Regarding this point, in this soccer game, a larger number of teammate players of a priority game player are selected as starting players than those of a non-priority game player. That is, a teammate player of a priority game player is selected with priority as a starting player, so that the priority game player can feel satisfied, and dissatisfaction due to assignment of a position that is different from a desired position to an operating player can be reduced.

[4-4. Start of Match: S104]

At S104, a soccer match starts. In this embodiment, initially, the control unit 6 of the game server decides starting players of the opponent team and then produces basic data, or a base for controlling the match.

FIG. 8 is a diagram showing one example of the above described basic data. As shown in the diagram, the basic data is a table correlating each of the forty-six player characters and data on the player characters. Basic data includes a player field, a team field, a participation field, a player type field, and an own player field.

In the player field, the ID of each player character is stored. For example, the ID of player data on a player character is used as the ID of the player character. In this embodiment, player characters having game player ID's numbered as "1" to "23" are those belonging to the operating team, while player characters having game player ID's numbered as "24" to "46" are those belonging to the opponent team. In the team field, a team flag indicating a team to which a player character belongs is stored. In this embodiment, "0" is stored for a player character belonging to an operating team, while "1" is stored for a player character belonging to an opponent team. Note that a player character belonging to an opponent team is hereinafter referred to as an opponent player.

In the participation field, a participation flag indicating whether or not a player character is participating in a match is stored. For example, a participation flag having the value "0" indicates that a player character is not yet participating in a match; a participation flag having the value "1" indicates that a player character is participating in a match; a participation flag having the value "2" indicates that a player character participated in a match but no longer participates in the match due to having been being exchanged with another player character. A player character having a participation flag having the value "2" cannot participate in a match again. The value of a participation flag is updated when the player character joins or leaves a match halfway through the match. Note that a player character having a participation flag having the value "0" is hereinafter described as a "player character not participating in a match". In the player type field, data describing the type of a player character is stored. In this embodiment, either one of "P", "F", and "E" is stored in the player type field. "P" indicates a player character being an "operating player"; "F" indicates a player character being a "teammate player"; and "E" indicates a player character being an "opponent player". In the own player field, data describing whether a player character is a player character owned by a game player or a player character prepared in advance in the optical disk 22 is stored. In this embodiment, for a player character owned by a game player, the ID of the game player who owns the player character is stored.

Note that, besides the above described data, the basic data includes, e.g., data specifying an operating player assigned a responsible position that is different from a desired position, or the name of an actual formation.

With basic data produced, the control unit 6 of the game server starts a match.

[5. Description of Match]

During a match, a common virtual three dimensional space is created in the main memories 8 of the respective game devices 2 (including a game server). In the virtual three dimensional space, three coordinate axes vertically intersecting with one another are defined so that a location in the virtual three dimensional space is specified by the coordinates in the respective axial directions. Further, in the virtual three dimensional space, eleven objects representing the player characters of the operating team participating in a match, eleven objects representing the player characters of the opponent team participating in the match, an object representing a soccer ball (moving object), an object representing a soccer field, an object representing the goal of the operating team, an object representing the goal of the opponent team, and so forth, are placed. With a soccer ball having moved in a goal of one team, a score event occurs to the other team.

Initially, in the virtual three dimensional space, a virtual camera is placed. A game screen image showing a picture obtained by viewing the virtual three dimensional space from the virtual camera is displayed on the display unit 16 of each game device 2. FIG. 9 shows one example of a game screen image displayed on the display unit 16 of each game device 2.

In this embodiment, game situation data describing the latest game situation is stored in the main memories 8 of the respective game devices 2 so that the virtual three dimensional space is commonly shared.

FIG. 10 is a diagram showing content stored as game situation data. As shown in the diagram, the game situation data is a table correlating each of the twenty two player characters participating in a match and data on the condition of the player character. The game situation data contains a player field, an operation target field, a position field, a ball holding field, a location field, a movement direction field, a posture field, an action field, and a tiredness field.

In the player field, the ID of a player character is stored. In the operation target field, data describing whether or not a player character is an operating player is stored. In this embodiment, for a player character being an operating player, the ID of a game player operating the player character is stored. In the position field, the ID of a responsible position assigned to a player character is stored. In the ball holding field, data describing whether or not a player character holds a soccer ball is stored. In this embodiment, "1" indicates that a player character holds a soccer ball; and "0" indicates that a player character does not hold a soccer ball. In the location field, data on the current location of a player character is stored. In the movement direction field, data describing the current movement direction of a player character is stored. Posture data contains data on the current posture of a player character. In the action field, data describing the type of an action being currently carried out by a player character is stored. In the tiredness field, a value indicating a tiredness level of a player character is stored. Note that an initial value "0" is stored in the tiredness field of a player character at the beginning of a match. Besides the above, the game situation data contains data on the current location or viewing direction of the virtual camera, data on the current location, movement direction, and moving speed of a soccer ball, and so forth.

A game player inputs an operation on the operation input unit 12 while looking at a game screen image, to thereby operate their operating player. In this embodiment, the game devices 2 (the game devices 2 of the game players P2 to P4) other than the game server send the content of operation by the game players P2 to P4 to the game server. The control unit 6 of the game server (the game device of the game player P1) updates game situation data every predetermined interval, based on the content of operation sent from the other game devices 2, content of operation by the payer P1, player data on a player character participating in a match, and so forth, and sends the updated game situation data to the respective game devices 2. With the above, the virtual three dimensional space is shared by the respective game devices 2 (including the game server).

Each operating player moves in the virtual three dimensional space or carries out a shoot or pass action according to the content of operation by a game player.

A teammate player and an opponent player automatically act according to a predetermined algorithm. For example, when an operating player gets closer to a teammate player holding a soccer ball, the teammate player kicks the soccer ball toward the operating player. In the following, an act of a teammate player kicking a soccer ball toward an operating player is described as a "pass toward an operating player".

With a teammate player making a "pass toward an operating player", the control unit 6 of the game server, after deciding the movement direction of the soccer ball based on the "cooperation ability" of the operating player, moves the soccer ball in the decided movement direction. FIG. 11 is a diagram explaining a method for deciding the movement direction of the soccer ball. In this embodiment, in the decision of the movement direction of the soccer ball, the control unit 6 of the game server decides the angle θ between the direction viewed from the position P of the soccer ball or a teammate player to the position Q of the operating player and the movement direction S of the soccer ball. In the above, a table correlating the "cooperation ability" of an operating player and the angle θ is read from the optical disk 22, and an angle θ correlated to the "cooperation ability" of the operating player is obtained from the table. Note that the above-described table is defined such that, e.g., a larger "cooperation ability" value of an operating player results in a smaller angle θ. As shown in FIG. 11, a larger angle θ results in poorer accuracy of a pass toward an operating player so that the operating player needs to move by a longer distance in order to receive the soccer ball. This resultantly increases a possibility that the operating player will fail to receive the soccer ball, and accordingly, the pass toward the operating player may fail.

Figure 4:
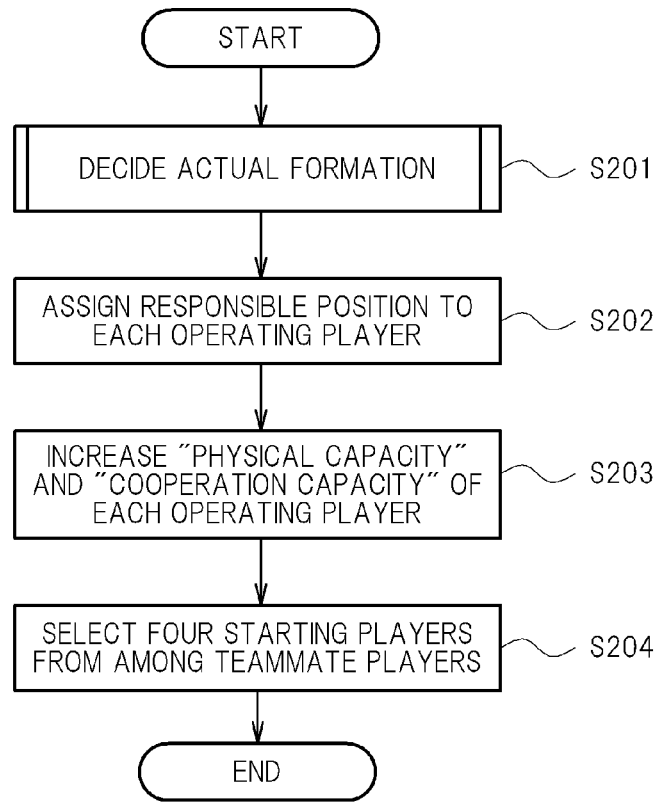
FIG. 4 is a flowchart of one example of a process to be carried out in a game server.

Here, as described above, the "cooperation ability" of an operating player assigned a responsible position that is different from a desired position (an operating player of a priority game player) is increased (S203 in FIG. 4). Therefore, the angle θ readily becomes smaller when a teammate player makes a "pass to an operating player of a priority game player". As a result, accuracy of a pass to an operating player of a priority game player tends to increase, so that the priority game player can feel satisfied. Regarding this point as well, it is possible to reduce dissatisfaction which may be felt by a game player due to assignment of a position that is different from a desired position to their operating player.

The control unit 6 of the game server increases the "tiredness level" of a player character participating in a match at predetermined intervals during the match. Specifically, the control unit 6 of the game server determines an addition value A, based on the "physical ability" of a player character participating in a match, and adds the addition value A to the "tiredness level" of the player character. In this embodiment, the control unit 6 of the game server (control means) reads from the optical disk 22 a table correlating "physical ability"

of a player character and an addition value A, and obtains an addition value A correlated to the "physical ability" of the player character from the table. Note that the table is defined, for example, such that a larger "physical ability" value results in a smaller addition value A. Because the table is defined such that a larger "physical ability" value results in a smaller addition value A, a larger "physical ability" of a player character results in the "tiredness level" of a player character increasing more slowly.

When the "tiredness level" of any player character reaches a reference tiredness level, a game player exchange event will occur. In the following, a condition with a "tiredness level" having reached a reference tiredness level is defined as a "tired condition". With a game player exchange event occurring, the control unit 6 of the game server selects a player character in a tired condition, and causes the player character to leave, or depart, the match. Then, the control unit 6 of the game server selects one player character to join, or enter, the match halfway through the match from among those belonging to the team of the player character having left the match and not participating in the match.

Figure 12:
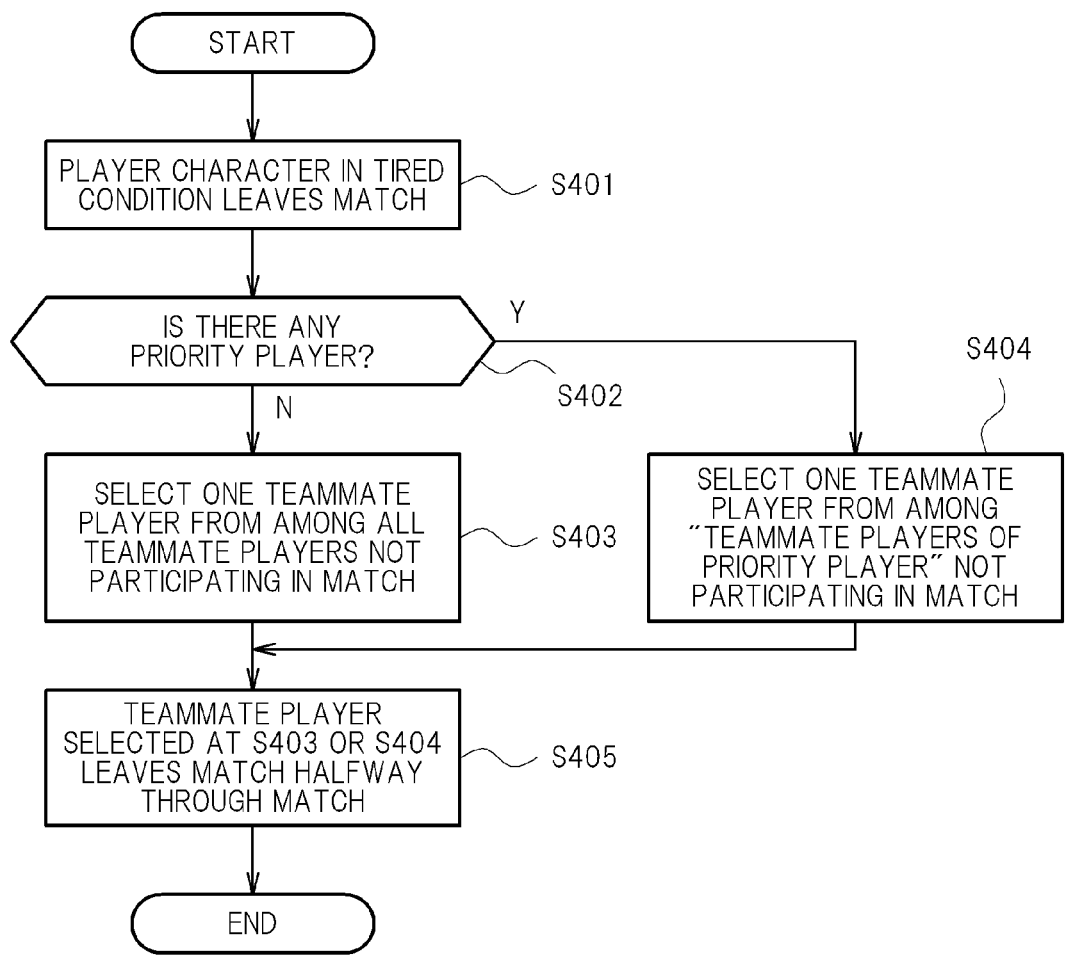
FIG. 12 is a flowchart of one example of a process to be carried out in a game server.

FIG. 12 is a flowchart of a process to be carried out by a game server in a game player exchange event which occurs when a player character belonging to the operating team is placed in a tired condition. In this process, initially, the control unit 6 of the game server (departure execution means) causes a player character in a tired condition to leave the match (S401). Specifically, the control unit 6 of the game server updates the participation flag of a player character in a tired condition from "1" to "2". Then, at S402 to S404, the control unit 6 of the game server (second selecting means) selects one teammate player from among the teammate players not participating in a match (a teammate player having a participation flag with "0"). In the above, selection of a teammate player is controlled based on a result of comparison between a responsible position assigned to an operating player and a desired position.

That is, the control unit 6 of the game server determines whether or not there is an operating player assigned a responsible position that is different from a desired position, with reference to the basic data, to thereby determine whether or not there is a priority game player (S402). With no priority game player present, that is, there is no operating player assigned a responsible position that is different from a desired position (N at S402), the control unit 6 of the game server selects one teammate player from among all teammate players not participating in the match (S403). For example, a teammate player is selected based on a random number. Then, the control unit 6 of the game server proceeds to S405.

Meanwhile, when there is a priority game player, that is, there is an operating player assigned a responsible position that is different from a desired position (Y at S402), the control unit 6 of the game server selects one teammate player not participating in the match from the "teammate players of the priority game player" (S404).

Thereafter, the control unit 6 of the game server causes the teammate player selected at S403 or S404 to join the match halfway through the match (S405). Specifically, a participation flag of the player character joining a match halfway through the match is updated from "0" to "1".

As described above, with a priority game player present, a teammate player of a priority game player is selected at S404, and caused to join the match halfway through the match. That is, a teammate player of a priority game player is caused to join a match with priority. As a result, the chance for a teammate player of a priority game player to participate in a match is increased, so that a priority game player can feel satisfied.

Regarding this point as well, it is possible to reduce dissatisfaction which may be felt by a game player due to assignment of a position that is different from a desired position to an operating player.

As described above, when a responsible position that is different from a desired position is assigned to an operating player, the "physical ability" of a teammate player owned by a game player (that is, a priority game player) operating the operating player is increased (S203 in FIG. 4). As a result, the tiredness level of the teammate player of the priority game player is increased at a slower speed. Therefore, the teammate player of the priority game player is less likely to be placed in a tired condition. This resultantly increases a chance for a teammate player of a priority game player to participate in a match, so that the game player can feel satisfied. Regarding this point as well, it is possible to reduce dissatisfaction which may be felt by the game player due to assignment of a position that is different from a desired position to an operating player.

When a time to terminate the match arrives, the control unit 6 of the game server terminates the match.

[6. Function Block]

Figure 13:
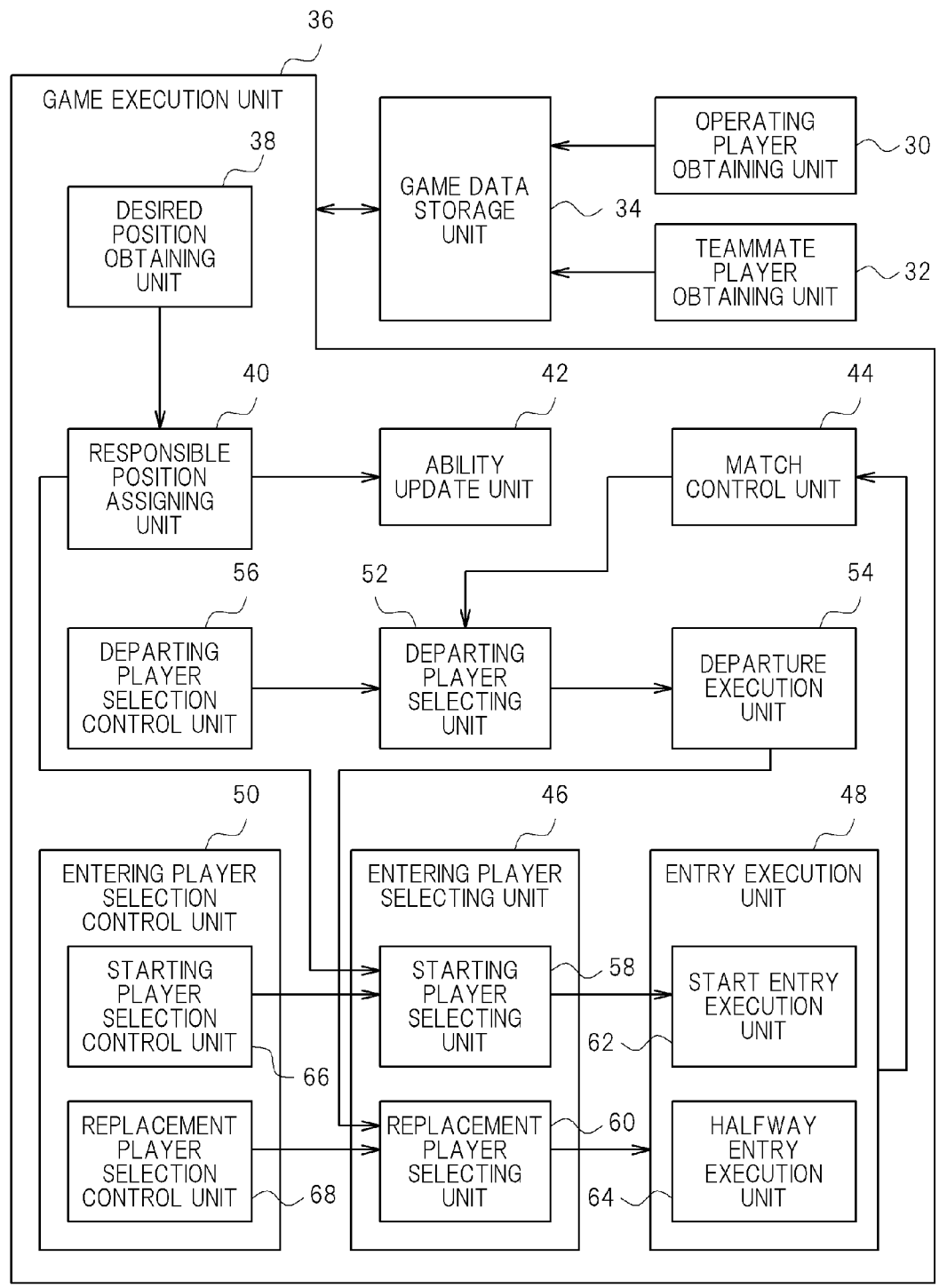
FIG. 13 is a diagram showing functional blocks realized in a game server.

FIG. 13 is a functional block diagram mainly showing functions according to the present invention among those realized in a game server. As shown in the diagram, the game server comprises an operating player obtaining unit 30, a teammate player obtaining unit 32, a game data storage unit 34, and a game execution unit 36. These functions are realized by the control unit 6 of the game server by operating the above described program.

[6-1. Operating Player Obtaining Unit]

The operating player obtaining unit 30 (operating character obtaining means) is realized mainly using the control unit 6 and the communication interface 14. For each of the plurality of game players, the operating player obtaining unit 30 obtains the player data on an operating player operated by the game player, and stores the obtained player data in the game data storage unit 34 (main memory 8). In this embodiment, the operating player obtaining unit 30 receives the player data on the respective operating players of the game players P2 to P4 from the game device 2, and also the player data on the operating player of the game player P1 from the memory card 24 (S101 in FIG. 3).

[6-2. Teammate Player Obtaining Unit]

The teammate player obtaining unit 32 (teammate character obtaining means) is realized mainly using the control unit 6 and the communication interface 14. For each game player, the teammate player obtaining unit 32 obtains the player data of one or more teammate players selected by the game player from among the plurality of player characters obtained by the game player, and stores the player data in the game data storage unit 34 (main memory 8). In this embodiment, the teammate player obtaining unit 32 receives the player data on the teammate players of the respective game players P2 to P4 and also the player data on the teammate player of the game player P1 from the memory card 24 (S102 in FIG. 3).

[6-3. Game Data Storage Unit]

The game data storage unit 34 (parameter storage means) is realized mainly using the main memory 8 and the optical disk 22. The game data storage unit 34 stores various data necessary for a game. Specifically, the data below are stored in this embodiment:

1. player data on player characters belonging to an operating team;
2. player data on player characters belonging to an opponent team;
3. first formation table (see FIG. 6);
4. second formation table (see FIG. 7);

5. basic data (see FIG. 8);
6. game situation data (see FIG. 10);
7. desired position of an operating player of a game player; and
8. desired position of a teammate player of a game player.

[6-4. Game Execution Unit]

The game execution unit 36 (game execution means) is realized mainly using the control unit 6. The game execution unit 36 carries out a game to be played by an operating team and an opponent team, based on the data stored in the game data storage unit 34. In this embodiment, the game execution unit 36 comprises a desired position obtaining unit 38 (desired role obtaining means), a responsible position assigning unit 40 (role assigning means), an ability update unit 42 (increase/decrease means), a match control unit 44, an entering player selecting unit 46 (teammate character selecting means, first teammate character selecting means), an entry execution unit 48 (entry execution means), an entering player selection control unit 50 (control means), a departing player selecting unit 52 (second teammate character selecting means), a departure execution unit 54 (departure execution means), and a departing player selection control unit 56 (control means).

[6-5. Desired Position Obtaining Unit]

The desired position obtaining unit 38 obtains a desired position of an operating player selected by a game player, and stores the desired position in the game data storage unit 34. In this embodiment, the desired position obtaining unit 38 receives the ID of a desired position of an operating player (S101 in FIG. 3).

[6-6. Responsible Position Assigning Unit]

The responsible position assigning unit 40 assigns a responsible position to each of the four operating players participating in a match. In this embodiment, the responsible position assigning unit 40 determines an actual formation, based on a desired position of an operating player, obtained by the desired position obtaining unit 38, the first formation table, the second formation table, and so forth (S201 in FIG. 4 and FIG. 5), and then assigns a responsible position to an operating player, based on the desired position of the operating player, a regular number of each position in the actual formation, and so forth (S202 in FIG. 4).

Note that in this embodiment, a responsible position is assigned to not only the four operating players participating in a match but also to seven teammate players participating in the match. That is, a responsible position is assigned to each of the seven teammate players including the three teammate players prepared in advance and read from the optical disk 22 and four teammate players selected by the starting player selecting unit 58 to be described later (S103 in FIG. 3, S204 in FIG. 4).

[6-7. Ability Update Unit]

Based on a result of comparison between a responsible position assigned to an operating player by the responsible position assigning unit 40 and a desired position of the operating player, obtained by the desired position obtaining unit 38, the ability update unit 42 updates a parameter value concerning the ability of the operating player. For example, when the responsible position assigned to an operating player differs from the desired position of the operating player, the ability update unit 42 increases or decreases the parameter value concerning the ability of the operating player such that the ability of the operating player becomes higher. In this embodiment, the ability update unit 42 increases the values of the "physical ability" and "cooperation ability" of an operating player assigned a responsible position that is different from a desired position (S203 in FIG. 4).

[6-8. Match Control Unit]

The match control unit 44 controls a soccer match to be carried out between an operating team and an opponent team. For example, the match control unit 44 starts or terminates a match. Further, during a match, the match control unit 44 updates the game situation data stored in the game data storage unit 34 at predetermined intervals, based on the player data stored in the game data storage unit 34 or content of operation by a game player, and so forth. With the above, the match control unit 44 causes a player character participating in a match to act, or moves the soccer ball.

In this embodiment, when a teammate player makes a "pass toward an operating player", the match control unit 44 controls the movement of the soccer ball, based on the "cooperation ability" of the operating player (see FIG. 11). In addition, the match control unit 44 updates the "tiredness level" of a player character participating in a match, based on the "physical ability" of the player character, a predetermined intervals. Specifically, the match control unit 44 determines the addition value A such that a larger "physical ability" of a player character participating in a match results in a smaller addition value A, and adds the addition value A to the "tiredness level" of the player character. Further, when any player character is placed in a tired condition, the match control unit 44 causes a game player exchange event to Occur.

[6-9. Entering Player Selecting Unit]

The entering player selecting unit 46 selects one or more teammate players to join a match from among the teammate players belonging to the operating team. In this embodiment, the entering player selecting unit 46 comprises a starting player selecting unit (first teammate character selecting means) and a replacement player selecting unit 60 (second teammate character selecting means).

[6-10. Starting Player Selecting Unit]

Before a match starts, the starting player selecting unit 58 selects one or more teammate players as starting players from among the sixteen "teammate players of the game players", belonging to the operating team. In this embodiment, as the four operating players corresponding to the four respective game players P1 to P4 and three teammate players prepared in advance are reliably selected as starting players, the remaining four teammate players are selected from the sixteen "teammate players of the game players".

Note that, in this embodiment, the starting player selecting unit 58 also selects eleven opponent players as starting players.

[6-11. Replacement Player Selecting Unit]

The replacement player selecting unit 60 selects one or more teammate players to join a match halfway through the match from among the "teammate players of the game players" (a teammate player of a game player, having a participation flag with "0") not participating in the match.

In this embodiment, the replacement player selecting unit 60 selects a teammate player to join a match halfway through the match every time a player character of the operation team is put in a tired condition.

[6-12. Entry Execution Unit]

The entry execution unit 48 causes the one or more teammate players selected by the entering player selecting unit 46 and the operating players to join a match.

In this embodiment, the entry execution unit 48 causes, through the functions of the start entry execution unit 62 (first entry execution means) and the halfway entry execution unit 64 (second entry execution means), the one or more teammate players selected by the entering player selecting unit 46, the operating players, and the three teammate players prepared in advance and read from the optical disk 22, to join a match.

[6-13. Start Entry Execution Unit]

The start entry execution unit 62 causes the one or more teammate players selected by the starting player selecting unit 58 and the operating players to join a match from the beginning. In this embodiment, the start entry execution unit 62 causes the eleven starting players including the operating players, the three teammate players read from the optical disk 22, and the four "teammate players of the game players", selected by the starting player selecting unit 58, to join a match from the beginning. Specifically, the values of the participation flags of these starting players are set to "1".

[6-14. Halfway Entry Execution Unit]

The halfway entry execution unit 64 causes the one or more teammate players selected by the replacement player selecting unit 60 to join a match halfway through the match. In this embodiment, every time the replacement player selecting unit 60 selects a teammate player, the halfway entry execution unit 64 causes the teammate player selected to join a match halfway through the match. Specifically, the halfway entry execution unit 64 updates the participation flag of a teammate player selected by the replacement player selecting unit 60 from "0" to "1".

[6-15. Entering Player Selection Control Unit]

Based on a result of comparison between a responsible position assigned to an operating player and a desired position of the operating player, the entering player selection control unit 50 (control means) controls selection by the entering player selecting unit 46 of a teammate player of a game player operating the operating player. In this embodiment, the entering player selection control unit 50 comprises a starting player selection control unit 66 and a replacement player selection control unit 68.

[6-16. Starting Player Selection Control Unit]

Based on a result of comparison between a responsible position assigned to an operating player and a desired position of the operating player, the starting player selection control unit 66 (control means) controls selection by the starting player selecting unit 58 of a teammate player of a game player operating the operating player. In this embodiment, when the responsible position assigned to an operating player is identical to the desired position of the operating player, selection by the starting player selecting unit 58 of a teammate player of a game player operating the operating player is restricted. Specifically, a teammate player of a game player (non-priority game player) operating an operating player assigned a responsible position identical to a desired position is less likely to be selected by the starting player selecting unit 58, while a teammate player of a game player (priority game player) operating an operating player assigned a responsible position that is different from a desired position is likely to be selected by the starting player selecting unit 58.

In this embodiment, the starting player selection control unit 66 controls selection of four teammate players by the starting player selecting unit 58, such that a larger number of teammate players of a game player (priority game player) operating an operating player assigned a responsible position that is different from a desired position are selected than teammate players of a game player (non-priority game player) operating an operating player assigned a responsible position identical to a desired position (S204 in FIG. 4).

Note that the starting player selection control unit 66 may control selection of four teammate players by the starting player selecting unit 58, such that the starting player selecting unit 58 selects a teammate player of a game player (priority game player) operating an operating player assigned a responsible position that is different from a desired position with a higher probability rate than that of a teammate player of a game player (non-priority game player) operating an operating player assigned a responsible position identical to a desired position. In this manner as well, a teammate player of a game player operating an operating player assigned a responsible position that is different from a desired position is selected as a starting player with priority, so that the game player can feel satisfied. As a result, it is possible to reduce dissatisfaction which may be felt by the game player due to assignment of a position that is different from a desired position to an operating player.

[6-17. Replacement Player Selection Control Unit]

Based on a result of comparison between a responsible position assigned to an operating player and a desired position of the operating player, the replacement player selection control unit (control means) controls selection by the replacement player selecting unit 60, of a teammate player of a game player operating the operating player. In this embodiment, when a responsible position assigned to an operating player is identical to a desired position of the operating player, selection by the replacement player selecting unit 60 of a teammate player of a game player operating the operating player is restricted. Specifically, a teammate player of a game player operating an operating player assigned a responsible position identical to a desired position is less likely to be selected by the replacement player selecting unit 60, while a teammate player of a game player operating an operating player assigned a responsible position that is different from a desired position is more likely to be selected by the replacement player selecting unit 60.

In this embodiment, when there is an operating player assigned a responsible position that is different from a desired position, the replacement player selection control unit 68 may cause the replacement player selecting unit 60 to select a teammate player of a game player operating the operating player, but not to select a teammate player of a game player operating an operating player assigned a responsible position identical to a desired position.

That is, when there is an operating player (priority game player) operating an operating player assigned a responsible position that is different from a desired position, the replacement player selection control unit 68 causes the replacement player selecting unit 60 to select one teammate player to join a match halfway through the match not from among the "teammate players of a non-priority game player" that are not participating in a match, but from among the "teammate players of a priority game player" that are not participating in a match (S402 to S404 in FIG. 12).

Note that the replacement player selection control unit 68 may control selection of one or more teammate players to join a match halfway through the match by the replacement player selecting unit 60, such that the replacement player selecting unit 60 selects a teammate player of a game player (priority game player) operating an operating player assigned a responsible position that is different from a desired position at a higher probability rate than a teammate player of a game player (non-priority game player) operating an operating player assigned a responsible position identical to a desired position. In this manner as well, the chance for a teammate player of a game player operating an operating player assigned a responsible position that is different from a desired position to participate in a match is increased, so that the game player can feel satisfied. As a result, it is possible to reduce dissatisfaction which may be felt by the game player due to assignment of a position that is different from a desired position to an operating player.

[6-18. Departing Player Selecting Unit]

During a match, the departing player selecting unit 52 selects one or more teammate players to leave, or depart from, a match from among the "teammate players of the game players", participating in the match. In this embodiment, every time a "teammate player of a game player" is placed in a tired condition, the departing player selecting unit 52 selects the teammate player in a tired condition (S401 in FIG. 12).

[6-19. Departure Execution Unit]

The departure execution unit 54 (departure execution means) causes one or more teammate players selected by the departing player selecting unit 52 to leave a match (S401 in FIG. 12). In this embodiment, every time the departing player selecting unit 52 selects a teammate player, the departure execution unit 54 causes the teammate player to leave the match. Specifically, the value of the participation flag of the teammate player selected by the departing player selecting unit 52 is updated from "1" to "2".

[6-20. Departing Player Selection Control Unit]

Based on a result of comparison between a responsible position assigned to an operating player and a desired position of the operating player, the departing player selection control unit 56 controls selection by the departing player selecting unit 52 or execution of departure by the departure execution unit 54 of a teammate player of a game player operating the operating player.

In this embodiment, when the responsible position assigned to an operating player differs from the desired position of the operating player, the departing player selection control unit 56 updates (increases) the value of the "physical ability" of a teammate player of a game player operating the operating player (S203 in FIG. 4). As a result, the tiredness level of the teammate player becomes less likely to increase, so that the teammate player becomes less likely to be tired. That is, the teammate player becomes less likely to be selected by the departing player selecting unit 52. In this manner, the departing player selection control unit 56 indirectly controls selection by the departing player selecting unit 52, of a teammate player of a game player operating an operating player assigned a responsible position that is different from a desired position. As described above, the chance for a teammate player of a game player operating an operating player assigned a responsible position that is different from a desired position to participate in a match is increased, so that the game player can feel satisfied. As a result, it is possible to reduce dissatisfaction which may be felt by the game player due to assignment of a position different from a desired position to an operating player.

Note that when a teammate player of a game player operating an operating player assigned a responsible position that is different from a desired position is selected by the departing player selecting unit 52, the departing player selection control unit 56 may restrict execution of departure by the departure execution unit 54. For example, when a teammate player of a game player operating an operating player assigned a responsible position that is different from a desired position is selected by the departing player selecting unit 52, execution of departure of the teammate player may be postponed by a predetermined period of time. For example, when a teammate player of a game player (non-priority game player) operating an operating player assigned a responsible position identical to a desired position is selected by the departing player selecting unit 52, the departure execution unit 54 immediately causes the teammate player to leave, while when a teammate player of a game player (priority game player) operating an operating player assigned a responsible position that is different from a desired position is selected by the departing player selecting unit 52, the departure execution unit 54 may be caused to postpone execution of departure of the teammate player until a predetermined period of time elapses. With the above, a teammate player of a game player operating an operating player assigned a responsible position that is different from a desired position keeps participating in a match for a longer period of time, which increases the chance for the teammate player of the game player to participate in the match. As a result, it is possible to arrange such that a game player operating an operating player assigned a responsible position that is different from a desired position can feel satisfied, and accordingly, dissatisfaction which may be felt by the game player due to assignment of a responsible position that is different from a desired position to an operating player can be reduced.

[7. Conclusion]

As described above, in a soccer game provided by the game device 2, as a player character collected by a game player constitutes a teammate player, diversity of combination of the player characters belonging to an operating team is improved. As a player character collected by a game player constitutes a teammate player, the diversity can be improved without increasing the data amount. In addition, as a player character collected by a game player constitutes a teammate player, incentive for collecting player characters is given to a game player.

In the above described soccer game, as a teammate player of a game player (priority game player) operating an operating player assigned a responsible position that is different from a desired position is selected as a starting player with priority, dissatisfaction due to assignment of a responsible position that is different from a desired position to an operating player can be reduced.

In the above described soccer game, as a teammate player of a game player (priority game player) operating an operating player assigned a responsible position that is different from a desired position is caused to join a match halfway through the match with priority, dissatisfaction due to assignment of a responsible position that is different from a desired position to an operating player can be reduced.

In the above described soccer game, as a teammate player of a game player (priority game player) operating an operating player assigned a responsible position that is different from a desired position is less likely to leave a match, dissatisfaction due to assignment of a responsible position that is different from a desired position to the operating player can be reduced.

In the above described soccer game, as accuracy in passing from a teammate player to an operating player assigned a responsible position that is different from a desired position is likely to increase, dissatisfaction due to assignment of a responsible position that is different from a desired position to the operating player can be reduced.

[8. Modified Example]

Note that an embodiment of the present invention is not limited to the above described embodiment.

For example, although a player character selected by a game player from among a plurality of player characters collected in a local mode constitutes an operating player in the above-described embodiment, a player character initially set by a game player in the local mode may always constitute an operating player. Further, although a game player selects as a teammate player a player character collected by themselves in the local mode in the above-described embodiment, player characters available for a game player to select as a teammate player are not limited to those collected in the local mode. For example, a player character having belonged to the team of the operating player of a game player in the local mode may be selected as a teammate player.

Besides the above, for example, in which a teammate player of a priority game player is caused to join a match with priority, there is another method available for reducing dissatisfaction due to assignment of a responsible position different from a desired position to an operating player. For example, the above described dissatisfaction can be reduced by selecting with priority a teammate player of a priority game player as a player character belonging to the operating team. In the following, an aspect in which a teammate player of a priority game player is selected with priority as a player character belonging to the operating team will be described.

According to this aspect, after obtaining the player data on, and desired positions of, the operating players of the respective game players at S101 (see FIG. 3), the control unit 6 of the game server (operating character obtaining means, desired role obtaining means, role assigning means) carries out the processes at S201 to S203 (see FIG. 4) to assign a responsible position to each of the operating players before proceeding to S102 (see FIG. 3). Then, after assigning a responsible position to each of the operating players, the control unit 6 of the game server (teammate character obtaining means) proceeds to S102, and obtains the player data on a teammate player selected by each game player.

Note that according to this aspect, in which a teammate player of a priority game player is selected with priority as a player character belonging to the operating team, the control unit 6 of the game server controls obtaining of the player data of a teammate player of a game player operating an operating player, based on a result of comparison between a responsible position assigned to the operating player and the desired position of the operating player.

For example, when a responsible position assigned to an operating player is identical to the desired position of the operating player, the control unit 6 of the game server restricts obtaining of the player data on a teammate player of a game player (non-priority game player) operating the operating player. Specifically, a teammate player selection request is not sent to a game device 2 of a non-priority game player, but sent to only a game device 2 of a game player (priority game player) operating an operating player assigned a responsible position that is different from a desired position. With the above, no player data on a teammate player is sent to the game server from a game device 2 of a non-priority game player having received no teammate player selection request, and resultantly, the control unit 6 of the game server receives only player data on a teammate player of a priority game player. Accordingly, only a teammate player of a priority game player is selected with priority as a player character belonging to the operating team, so that the priority game player can feel satisfied. As a result, it is possible to reduce dissatisfaction due to assignment of a responsibility position different from a desired position to an operating player.

[9. Others]

A match to be played between an operating team (a player character group) and an opponent team (an opponent group) is not limited to a soccer match. For example, a match of a sport other than soccer (e.g., American football, ice hockey, basket ball, volley ball, baseball, water polo, hand ball, rugby, cricket, and so forth) is applicable. In addition, the match is not limited to a sport match. That is, a game provided by the game system 4 is not limited to a sport game. For example, a game provided by the game system 4 may be an action game in which a player character group fights with an opponent character group or an opponent character, a gun shooting game, or the like.

For example, a match may be carried out between two player character groups.

The invention claimed is:

1. A game device for implementing a match in which a player character group corresponding to a plurality of game players competes with an opponent character or an opponent character group opposing the player character group, the game device comprising:
   operating character obtaining means for obtaining, for each of the plurality of game players, data on an operating character operated by the game player;
   teammate character obtaining means for obtaining, for at least one game player among the plurality of game players, data on one or more teammate characters selected by the game player from among a plurality of characters owned by the game player; and
   game execution means for implementing a match in which the player character group, to which a plurality of operating characters corresponding to the plurality of game players and the teammate character selected by the at least one game player belong, competes with the opponent character or the opponent character group, based on the data obtained by the operating character obtaining means and the data obtained by the teammate character obtaining means,
   wherein the game execution means includes:
      desired role obtaining means for obtaining a desired role of each of the operating characters,
      role assigning means for assigning a role to each of the operating characters,
      teammate character selecting means for selecting one or more teammate characters from among teammate characters belonging to the player character group,
      entry execution means for causing the one or more teammate characters selected by the teammate character selecting means and the respective operating characters to enter the match, and
      control means for controlling, based on a result of comparison between the role assigned to an operating character and the desired role of the operating character, obtained by the desired role obtaining means, selection by the teammate character selecting means of a teammate character owned by a game player operating the operating character.

2. The game device according to claim 1, wherein the teammate character selecting means includes:
   first teammate character selecting means for selecting, before the match starts, one or more teammate characters from among the teammate characters belonging to the player character group, and
   second teammate character selecting means for selecting one or more teammate characters from among teammate characters not selected by the first teammate character selecting means,
the entry execution means includes:
   first entry execution means for causing, at the beginning of the match, the one or more teammate characters selected by the first teammate character selecting means and the respective operating characters to enter the match, and
   second entry execution means for causing the one or more teammate characters selected by the second teammate character selecting means to enter the match halfway through the match, and
the control means controls, based on a result of comparison between the role assigned to an operating character and the desired role of the operating character, obtained by the desired role obtaining means, selection by the second teammate character selecting means of a teammate character owned by a game player operating the operating character.

3. The game device according to claim 1, wherein the game execution means further includes:
  second teammate character selecting means for selecting one or more teammate characters during the match from among teammate characters participating in the match,
  departure execution means for causing the one or more teammate characters selected by the second teammate character selecting means to depart from the match, and
  means for controlling, based on a result of comparison between the role assigned to an operating character and the desired role of the operating character, obtained by the desired role obtaining means, selection by the second teammate character selecting means or execution of departure by the departure execution means of a teammate character owned by a game player operating the operating character.

4. A game device for implementing a match in which a player character group corresponding to a plurality of game players competes with an opponent character or an opponent character group opposing the player character group, the game device comprising:
  operating character obtaining means for obtaining, for each of the plurality of game players, data on an operating character operated by the game player;
  teammate character obtaining means for obtaining, for at least one game player among the plurality of game players, data on one or more teammate characters selected by the game player from among a plurality of characters owned by the game player;
  game execution means for implementing a match in which the player character group, to which a plurality of operating characters corresponding to the plurality of game players and the teammate character selected by the at least one game player belong, competes with the opponent character or the opponent character group, based on the data obtained by the operating character obtaining means and the data obtained by the teammate character obtaining means;
  desired role obtaining means for obtaining a desired role selected by each of the plurality of game players;
  role assigning means for assigning a role to each of the operating characters;
  parameter storage means for storing a parameter on each of the operating characters; and
  increase/decrease means for, based on a result of comparison between the role assigned to an operating character and a desired role selected by a game player operating the operating character, increasing or decreasing a value of the parameter on the operating character.

5. A game device method for controlling a game device for implementing a match in which a player character group corresponding to a plurality of game players competes with an opponent character or an opponent character group opposing the player character group, the method comprising:
  an operating character obtaining step of obtaining, for each of the plurality of game players, data on an operating character operated by the game player;
  a teammate character obtaining step of obtaining, for at least one game player among the plurality of game players, data on one or more teammate characters selected by the game player from among a plurality of characters owned by the game player; and
  a game executing step of implementing a match in which the player character group, to which a plurality of operating characters corresponding to the plurality of game players and the teammate character selected by the at least one game player belong, competes with the opponent character or the opponent character group, based on the data obtained at the operating character obtaining step and the data obtained at the teammate character obtaining step,
  wherein the game execution step includes:
    a desired role obtaining step of obtaining a desired role of each of the operating characters,
    a role assigning step of assigning a role to each of the operating characters,
    a teammate character selecting step of selecting one or more teammate characters from among teammate characters belonging to the player character group,
    a entry execution step of causing the one or more teammate characters selected by the teammate character selecting step and the respective operating characters to enter the match, and
    a control step of controlling, based on a result of comparison between the role assigned to an operating character and the desired role of the operating character, obtained by the desired role obtaining step, selection by the teammate character selecting step of a teammate character owned by a game player operating the operating character.

6. A non-transitory computer readable information storage medium for storing a program for causing a computer to function as a game device for implementing a match in which a player character group corresponding to a plurality of game players competes with an opponent character or an opponent character group opposing the player character group, the program for causing the computer to function as:
  operating character obtaining means for obtaining, for each of the plurality of game players, data on an operating character operated by the game player;
  teammate character obtaining means for obtaining, for at least one game player among the plurality of game players, data on one or more teammate characters selected by the game player from among a plurality of characters owned by the game player; and
  game execution means for implementing a match in which the player character group, to which a plurality of operating characters corresponding to the plurality of game players and the teammate character selected by the at least one game player belong, competes with the opponent character or the opponent character group, based on the data obtained by the operating character obtaining means and the data obtained by the teammate character obtaining means,
  wherein the game execution means includes:
    desired role obtaining means for obtaining a desired role of each of the operating characters,
    role assigning means for assigning a role to each of the operating characters,
    teammate character selecting means for selecting one or more teammate characters from among teammate characters belonging to the player character group,
    entry execution means for causing the one or more teammate characters selected by the teammate character selecting means and the respective operating characters to enter the match, and control means for controlling, based on a result of comparison between the role assigned to an operating character and the desired role of the operating character, obtained by the desired role obtaining means, selection by the teammate character selecting means of a teammate character owned by a game player operating the operating character.

* * * * *